Jan. 30, 1940.          F. E. NICKEL                2,188,556
                    RADIO COMPASS SYSTEM
                     Filed Aug. 3, 1936          3 Sheets-Sheet 1

INVENTOR.
Frederick E. Nickel
BY
        ATTORNEYS

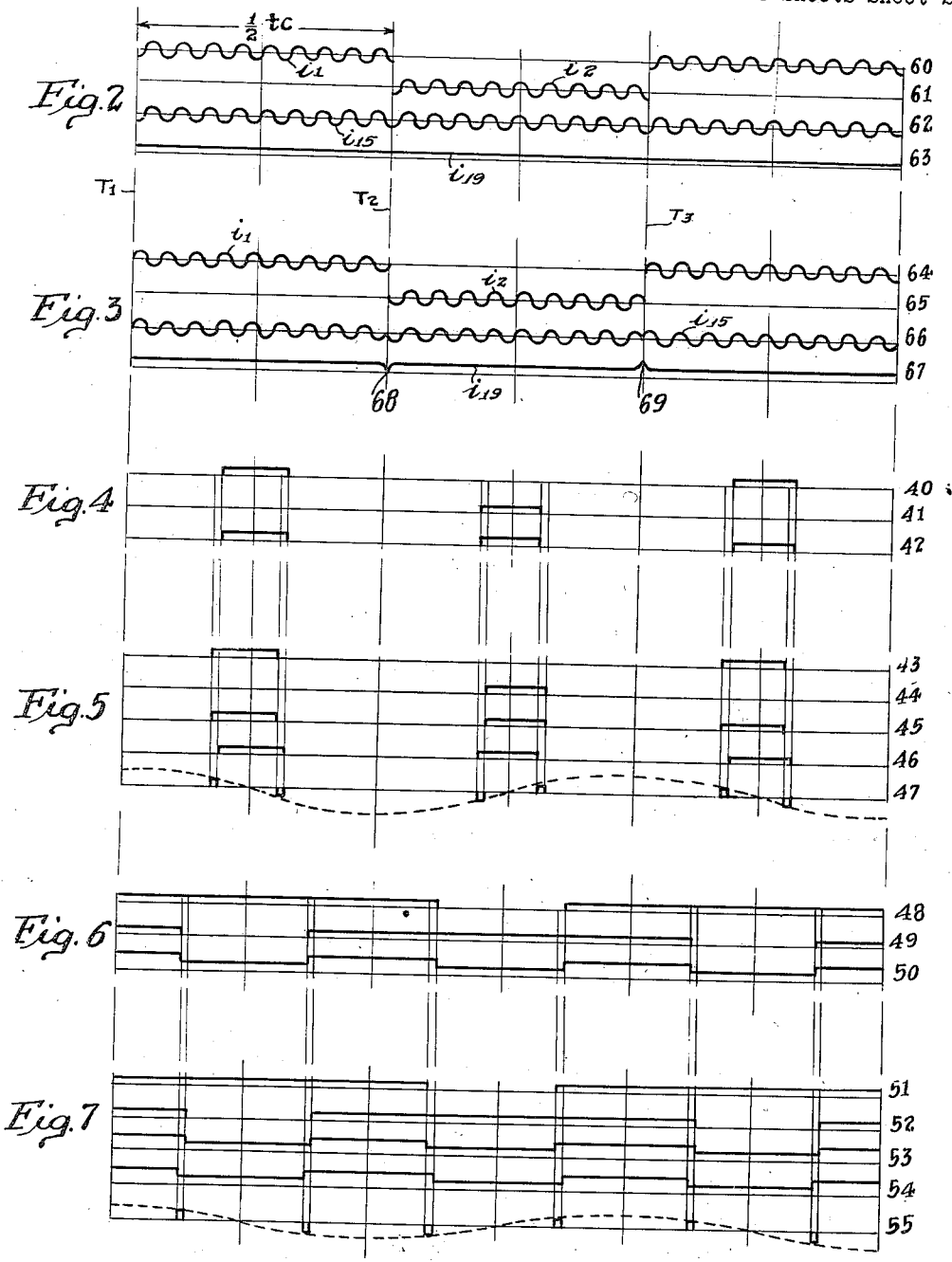

Jan. 30, 1940.  F. E. NICKEL  2,188,556
RADIO COMPASS SYSTEM
Filed Aug. 3, 1936  3 Sheets-Sheet 3

INVENTOR.
Frederick E. Nickel
BY Lyon & Lyon
ATTORNEYS

Patented Jan. 30, 1940

2,188,556

UNITED STATES PATENT OFFICE 2,188,556

RADIO COMPASS SYSTEM

Frederick E. Nickel, San Diego, Calif., assignor to Solar Aircraft Company, San Diego, Calif., a corporation of California Application August 3, 1936, Serial No. 93,983

14 Claims. (Cl. 250—11)

This invention relates broadly to apparatus for detecting phase differences in high frequency currents and has particular application in radio compasses for indicating the direction of propagation of received radio waves. The invention is of particular utility in radio compass systems for aircraft although it is adaptable to other installations.

A broad object of the invention is to provide a simple and inexpensive system for indicating very slight phase differences in two radio frequency currents.

Another object is to simplify and reduce the expense of radio compass systems.

Another object is to provide a simple and inexpensive radio compass system which may at the same time be employed for receiving radio communications.

Another object is to provide a radio compass responsive to radio waves of widely varying frequencies with substantially equal efficiencies.

Another object is to provide a radio compass system which is not dependent for its operation upon directive antennas, such as loops and the like, and is not subject to the deficiencies of loop antennas at ultra high frequencies.

Another object is to provide a radio compass system requiring only very simple, non-directional antenna structures for its operation.

Still another object is to provide a radio compass system, the operation of which can be made substantially independent of the plane of polarization of the received radio waves.

Still another object is to provide a compass system equally well adapted to indicate either the horizontal or the vertical angle of the direction of propagation of the received radio waves.

Other specific objects and features of the invention will become apparent from the detailed description to follow.

This is a continuation in part of my application Serial No. 52,781, filed December 4, 1935, entitled "Radio directional apparatus for aircraft".

Heretofore, to the best of my knowledge, all radio compass systems of the "homing" type (the type which gives merely an indication of the direction of propagation of the waves) have employed antenna structures which were inherently directive. In general such systems employ a loop antenna or its equivalent which, as is well known, has a figure 8 directional characteristic. By suitably combining the signal from a loop or similar structure having a figure 8 characteristic with signals from a non-directional antenna structure, a system having a cardioid characteristic can be obtained. Various methods have been employed to produce visual indications in response to signals received on an antenna structure or assembly having a cardioid characteristic.

The system of the present invention differs fundamentally from all previous systems of which I am aware in that it does not employ any antenna structure which has an inherent directional characteristic. I prefer to employ two simple, non-directional antennas and determine solely from the phase differences in the currents from these two antennas what the direction of propagation of a received radio wave is. The advantages of such a system are well recognized by those skilled in the art but heretofore it was apparently not known how to determine the phase differences in the currents from two such antennas.

The manner in which I determine these phase differences will now be explained with reference to the drawings, in which Fig. 1 is a schematic circuit diagram of a radio compass system in accordance with the invention;

Figs. 2, 3, 4, 5, 6, 7, 8, and 9 are curves explaining the operation of my system under different conditions;

Figure 1:
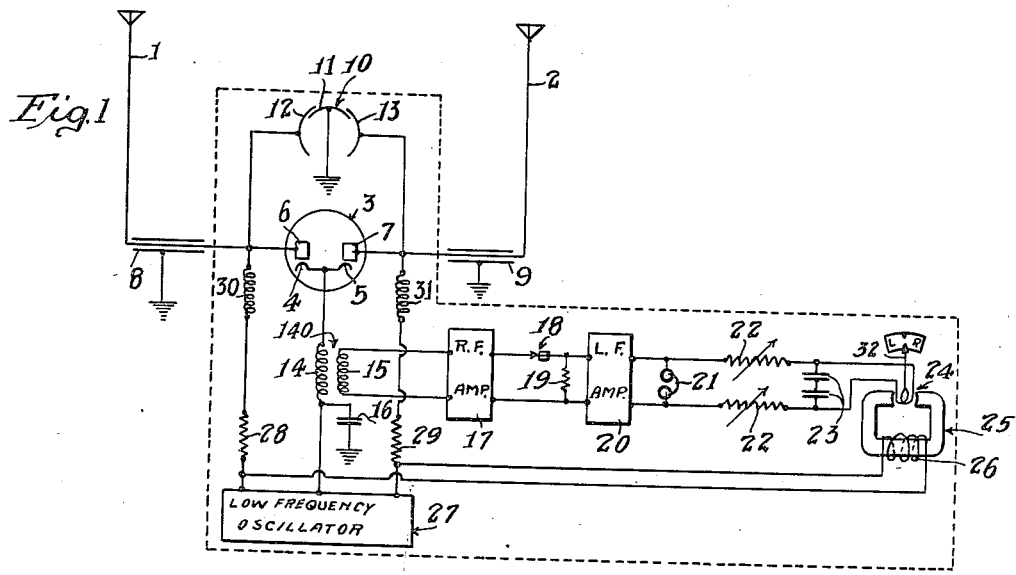

Referring to Fig. 1 the system therein depicted comprises a pair of antennas 1 and 2, respectively, which may be of many different constructions depending upon the location of the compass. These antennas are preferably non-directional and are symmetrical with respect to each other and are spaced apart a convenient distance. The greater the effective distance between the two antennas, the greater will be the sensitivity of the compass. However, there is no definite minimum limit of spacing and excellent results have been obtained with spacings of only a few yards.

Each antenna is connected directly to one of the anodes of a duo-diode rectifier tube 3 having two cathodes 4 and 5, respectively, and two anodes 6 and 7, respectively, and all positioned within a common envelope. The cathodes 4 and 5 are heated to emit electrons by separate heater elements (not shown) in accordance with standard vacuum tube practice. The antenna 1 is connected to the anode 6 and the antenna 2 is connected to the anode 7. As shown in the drawings, each antenna consists primarily of a vertical conductor connected at the lower end to the diode through a horizontal conductor. It is desirable under some conditions to shield the horizontal portions of each antenna structure and for this reason these portions are shown enclosed in grounded shields 8 and 9, respectively.

As previously stated, it is desirable that the two antenna structures be symmetrical. Since it is difficult in practice to obtain absolute symmetry, it is usually desirable to provide a balancing condenser 10 having a movable plate 11 connected to ground and a pair of fixed plates 12 and 13 connected to the anodes 6 and 7, respectively. By shifting the movable plate 11 compensation can be made for slight differences in the electrical properties of the two antenna structures.

The sole function of the rectifier tube 3 is to synchronously alternately connect the antennas 1 and 2 to a receiving system. Thus the cathodes 4 and 5 are connected together through the primary winding 14 of a radio frequency transformer 140 to ground through a condenser 16 so that when the space between cathode 4 and anode 6 is conductive antenna 1 is effectively connected to ground through winding 14, and when the space between cathode 5 and anode 7 is conductive the antenna 2 is connected to ground through winding 14. Radio frequency currents from either antenna passing through winding 14 induce similar currents in the secondary winding 15 which are amplified in a radio frequency amplifier 17, rectified or detected by a half wave rectifier 18 and the rectified currents applied by means of a coupling resistor 19 to a low frequency amplifier 20. From the low frequency amplifier 20 the currents may be applied to a pair of head phones 21 and also through a filter comprising resistances 22 and condensers 23 to the moving coil 24 of a dynamometer type indicator 25. The field 26 of the instrument 25 is energized with alternating current of a suitable low frequency from a low frequency oscillator 27 and potential from the oscillator 27 is also applied through resistors 28 and 29 and radio frequency choke coils 30 and 31 to the anodes 6 and 7 of the tube 3.

The low frequency oscillator 27 may be of any convenient type. Dynamo-electric type machines have been used successfully in practice, but there is no reason why a vacuum tube oscillator or any other known type of oscillator can not be used since the sole function of this device is to supply a low frequency alternating current. The actual frequency depends upon a number of conditions. Thus, the frequency should be that at which the dynamometer type instrument 25 will operate efficiently. It will also be developed later that the best results are obtained with relatively high frequencies. In actual practice, very successful results have been obtained employing a frequency of about 400 cycles, but it is quite possible that somewhat better efficiencies can be obtained with higher frequencies.

The cathodes 4 and 5 of tube 3, in addition to being connected to ground through the winding 14 and the condenser 16, are connected to a mid tap on the low frequency oscillator 27 so that during one-half cycle of the low frequency current the anode 6 is maintained positive with respect to its associated cathode 4 and the anode 7 is maintained negative with respect to its associated cathode 5. During the next half cycle the conditions are reversed. As is well known, there is no conduction between the cathode and anode of a thermionic vacuum tube when the anode is negative with respect to the cathode. Therefore, during the interval that either anode 6 or 7 is negative with respect to the cathodes, the antenna connected to that anode is disconnected from the winding 14 and the other antenna, which is connected to the other anode, which is positive with respect to the cathodes, is in effect connected to the winding 14. The potentials applied from the oscillator 27 to the anodes 6 and 7 are so large compared to the radio frequency potentials developed in the antennas 1 and 2 that the transition period from conductive to non-conductive condition and vice versa of each anode is extremely short as compared with the period of a cycle of the radio frequency current and may be considered as practically instantaneous.

The radio frequency chokes 30 and 31 are provided to prevent by-passing of the radio frequency currents from the antennas through the oscillator 27 and the resistors 28 and 29 are provided to limit the potentials applied from the oscillator to the anodes 6 and 7 and to insure that the potentials applied to the anodes will be substantially sinusoidal.

The operation of the system will be explained as follows:

Assume that the two antennas 1 and 2 are in a plane perpendicular to the direction of propagation of a received radio wave. In other words, they lie in the plane of the wave front. Under these conditions alternating potentials of the frequency of the received radio wave will be induced in both antennas and the potentials in both antennas will be substantially in phase with each other. As previously described, the space paths between cathode 4 and anode 6 and cathode 5 and anode 7 become conductive alternately in response to the low frequency potential applied thereto from the oscillator 27, thereby functioning to alternately connect antennas 1 and 2 to the primary winding 14 of the radio frequency transformer 140. Thus, referring to Fig. 2, curve 60 represents the current flowing in antenna 1, anode 6, cathode 4 and winding 14, and curve 61 represents the current flowing in antenna 2, anode 7, cathode 5 and winding 14. The current in each antenna consists of a series of trains of waves $i_1$ and $i_2$, respectively, each train persisting during one-half cycle of the commutating frequency (½ $t_c$ in Fig. 2) and the two trains recurring alternately. These two currents from the two antennas both flow in winding 14, together with the low frequency current from the oscillator 27. The radio frequency component of the current in winding 14 induces a similar current in the winding 15, but because of the low inductances and loose coupling of windings 14 and 15 the low frequency currents are not transferred to winding 15. By combining curves 60 and 61, curve 62 is obtained which is an uninterrupted wave $i_{15}$. This wave $i_{15}$ is amplified in amplifier 17 and rectified by the half wave rectifier 18. Since the wave $i_{15}$ is uninterrupted it produces, when rectified, a pure direct current $i_{19}$, as shown in curve 63, which, when applied to the movable coil 24 of the instrument 25, is incapable of actuating the indicator 32 because it reacts with the low frequency alternating field flux of the instrument to tend to move the pointer first in one direction and then in the other and because of the inertia of the moving coil system the pointer 32 remains stationary in center position. This indicates that the antennas 1 and 2 are in the plane of the received wave front.

Now assume that all the conditions remain the same except that the positions of the antennas 1 and 2 are changed with respect to the direction of propagation of the received radio wave so that they no longer lie in the plane of the wave front. Assume further that the antenna 1 is now closer to the source of radio waves than the antenna 2 so that the phase of the radio frequency currents in antenna 1 is advanced with respect to the phase of the radio frequency currents in antenna 2. Under these conditions, referring to Fig. 3, curve 64, it will be observed that the first positive half wave of the train $i_1$ occurs soon after the instant of commutation $T_1$ and that the last positive half wave ends an appreciable interval before the next instant of commutation $T_2$. On the other hand, the phase conditions are reversed in the wave train $i_2$ (curve 65 in Fig. 3). Here all the positive half waves are delayed. When the wave trains $i_1$ and $i_2$ are combined, the resultant current $i_{15}$ as shown in curve 66 is not uniform, there being a delay between successive positive half waves at time $T_2$ and the successive positive half waves at time $T_3$ being crowded together. When this current is rectified, the rectified current no longer has the same unvarying magnitude as it did under the conditions of Fig. 2. Thus from inspection of Fig. 3 it will be observed that between the first and second half cycles of the commutating frequency (time $T_2$) there is a dip 68 whereas between the second and third half cycles of the commutating frequency (time $T_3$) there is a peak 69 in the current. We therefore have a variation in the rectified current which repeats once during each cycle of the commutating frequency. Under the conditions outlined in connection with Fig. 3, there will therefore be an A. C. component in the rectified current $i_{19}$ of frequency equal to the commutating frequency and this component, when applied to the moving coil 24, will react with the alternating field flux of the same frequency to shift the moving coil and shift the indicator 32 either to the left or to the right, depending upon the polarity of the connections to the moving coil. By suitably connecting the coil 24, the needle 32 can be caused to move to the left in response to an advance of the phase of the radio frequency currents in antenna 1 with respect to antenna 2, thereby indicating that the source of radio waves is positioned to the left of a plane perpendicular to the common plane of the two antennas.

If the positions of the two antennas 1 and 2 were reversed so that the radio frequency current in antenna 2 was advanced in phase with respect to that in antenna 1, then the A. C. component of the commutating frequency in the rectified current would be displaced 180° from that occurring under the conditions shown in Fig. 3, causing the indicator 32 to move in the opposite direction.

In order to present the simple graphic explanation of Figs. 2 and 3, it was necessary to assume the special conditions in which the commutation occurred during negative half cycles of the radio frequency waves and the detector 5 was so connected as to utilize the positive halves and suppress the negative halves of the radio frequency waves. The first condition would seldom, if ever, obtain in practice but it is found unnecessary to the operation of the compass and it can be shown mathematically that regardless of the time in the radio frequency cycle when commutation occurs, a phase difference in the radio frequency currents in the two antennas produces a phase shift between the rectified envelopes of those currents.

Figure 8:
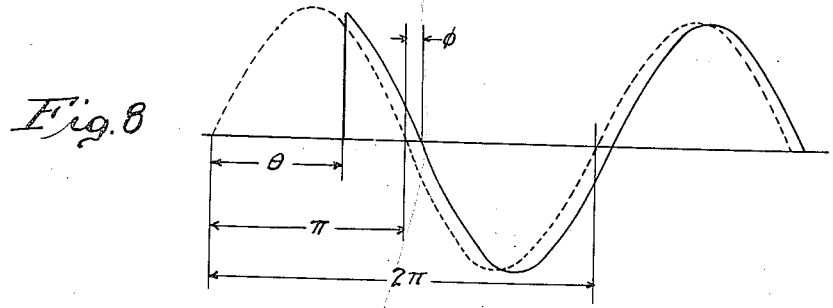

That a phase difference in the currents in the two antennas will produce a phase difference in the rectified envelopes of those waves regardless of the time in the radio frequency cycle at which commutation occurs will now be shown with reference to Fig. 8. This figure represents the conditions existing at the beginning of the train of waves received from the antenna, the radio frequency voltage of which is lagging its normal position by the phase angle $\phi$. The normal position is shown in dotted lines and the actual voltage applied to the receiver under these conditions is shown in the solid line. The angle $\theta$ represents the angle corresponding to the time within the radiofrequency cycle at which commutation occurs. This angle will vary at random from zero to 360° (or zero to $2\pi$ radians) since the frequency of the commutating voltage will seldom, if ever, be an exact submultiple of the radio frequency.

The phase angle $\phi$ of the radio frequency voltage in the antenna will be preserved during amplification within the radio frequency amplifier 17 up to the rectification in the rectifier 18. Therefore, in order to determine the form of the envelope in the detector output, it is only necessary to consider the timing of the average value of the positive half cycles of the radio frequency input to the receiver (assuming that the rectifier 18 is so connected as to rectify the positive half waves of the radio frequency signal). If the positive half cycles are all present but delayed in time (the condition discussed in connection with Figs. 2 and 3) the entire train of impulses will be delayed a time corresponding exactly to the angle $\phi$. On the other hand, if commutation happens to occur during one of the positive half cycles, it becomes necessary to consider the change which the angle $\phi$ introduces into the average value of the partial positive half cycle at the beginning of the train. If $\phi$ is equal to zero, the average value of the positive portion of the first half cycle will be (1) $$\frac{E}{\pi}\int_{\theta}^{\pi} \sin wt\, d(wt) = \frac{E}{\pi}(1 + \cos\theta)$$

where E is the maximum value of the radio frequency voltage.

It will be observed from Formula (1) that the average value will vary between zero and $$\frac{2E}{\pi}$$

When $\phi$ is not equal to zero, the average value of the positive portion of the first half cycle becomes (2) $$\frac{E}{\pi+\phi}\int_{\theta}^{\pi+\phi} \sin(wt-\phi)\,d(wt) = \frac{E}{\pi+\phi}[1+\cos(\theta-\phi)]$$

It should be noted that these averages are taken from the instant at which the voltage represented by the dotted curve first becomes positive (the starting point of the train of impulses if $\phi$ is zero) to the end of the first positive half cycle. After the end of this first half cycle the average value of the remainder of the train of impulses will be the same for any value of the phase angle $\phi$. In order to take into account the fact that $\theta$ will vary in a random fashion, it is now necessary to find the average value of expressions (1) and (2) for all the possible values of $\theta$. In the case of expression (1) this angle can vary from zero to 180° whereas in the case of expression (2) it can vary from $\phi$ to $\phi+180°$ ($\phi+\pi$ radians). It can be shown that the average value of each cosine term is therefore zero and the average voltage during the first half cycle, taking into account all possible values of $\theta$, is therefore $$\frac{E}{\pi+\phi}$$

which becomes $$\frac{E}{\pi}$$

when $\phi$ is zero. Thus the angle $\phi$ causes a reduction in the average value of the first half cycle and this is equivalent in effect to a delay in the starting of the impulses, such as the delay which actually occurs when commutation takes place during one of the negative half cycles.

It will be observed, however, that the effective shift in the envelope when commutation occurs during a positive half cycle is less than that obtained when commutation occurs during a negative half cycle, although the shift is in the same direction. This indicates that half wave rectification will give greater sensitivity than full wave rectification because in the former case commutation will occur during suppressed half cycles of the radio frequency waves during half of the total time whereas in the latter case both positive and negative half cycles of the radio frequency waves are preserved in rectification and commutation must therefore always occur during a preserved half cycle.

It is to be understood, however, that although half wave rectification appears to be preferable from the standpoint of efficiency, full wave rectification is operative in my system. Furthermore, other forms of detection circuits may be employed instead of simple half wave or full wave rectifiers. Thus three-electrode vacuum tubes may be used as detectors either by employing a high negative bias on the grid or by using a grid condenser and grid leak.

Under the conditions outlined in Figs. 2 and 3, it was assumed that there was zero overlap in the conductive periods of anodes 6 and 7, respectively. In other words, each anode became non-conductive at the exact instant that the other anode became conductive. This condition is not essential to the operation of the system. By applying a D. C. bias to the anodes 6 and 7 with respect to the cathodes 4 and 5 (as by connecting a battery in series with the winding 14), the conductive periods of the two anodes can be made to overlap or can be made to have dead intervals therebetween. By applying a negative bias to the anodes 6 and 7, and thereby causing the conductive periods of the two anodes to be shortened, the condition shown in Figs. 4 and 5 may be produced. Fig. 4 is similar to Fig. 2 except that the showing of the radio frequency waves has been eliminated and the rectified envelopes of those waves substituted. To further simplify the diagram, it has been assumed that these rectified trains are rectangular.

As shown in curve 40, the rectified impulses from antenna 1 are relatively short and likewise the rectified impulses from antenna 2 as shown in curve 41 are short. By combining the curves 40 and 41, curve 42 is obtained which represents the shape of the current applied to the instrument 25. This current contains a relatively large alternating component of double the commutating frequency but no component of fundamental frequency. Hence, no deflection of the instrument would be produced. This is to be expected since the impulses from both antennas are spaced exactly equidistant apart, as clearly shown in Fig. 4.

Fig. 5 differs from Fig. 4 only in that the phase of the radio frequency impulses in antenna 1 has been retarded with respect to the phase of the impulses in antenna 2, curve 43 representing the rectified envelopes of the impulses received on antenna 1 and curve 44 representing the rectified envelopes of the impulses received on antenna 2. When the impulses represented by curves 43 and 44 are added, curve 45 is obtained, which curve contains a large component of frequency double the commutating frequency and an additional component. Curve 46 represents the component of double the commutating frequency (this curve being similar to curve 42 of Fig. 4). By subtracting curve 46 from curve 45 to eliminate the double frequency component, curve 47 is obtained, which consists of impulses so poled and spaced as to have a component of the commutating frequency, the latter being represented by the dotted line. This component will actuate the instrument 25 to produce an indication.

Fig. 6 represents the conditions obtaining when positive bias is applied to the anodes 6 and 7 and the currents in the two antennas are in phase. Under these conditions the envelopes of the rectified current from antenna 1 and antenna 2, as shown in curves 48 and 49, respectively, are relatively long and when combined produce a current of double the commutating frequency as shown in curve 50.

Fig. 7 represents the same conditions except that the radio frequency impulses in antenna 1 lag those in antenna 2, curve 51 representing the envelope of the rectified current from antenna 1 and curve 52 representing the rectified envelope of the current from antenna 2. When curves 51 and 52 are combined they produce the curve shown in 53, which may be analysed into a double frequency component as shown in curve 54 and the short impulses shown in curve 55 which are of such polarity and occur at such times as to have a component of the fundamental commutating frequency as shown in the dotted line. Under the conditions shown in Fig. 7, an indication would therefore be produced on the instrument 25.

It will be observed from Figs. 4 to 7 that regardless of whether the rectifier tube 3 is adjusted to make each anode conductive during less than half a cycle (a condition hereinafter referred to as negative overlap) or is adjusted to make each anode conductive during more than half a cycle of the commutating frequency (the condition hereinafter referred to as positive overlap), a rectified component of the commutating frequency will result whenever the currents in antennas 1 and 2 are out of phase with each other. However, the greatest efficiency is obtained when the current from each antenna is applied to the winding 14 during exactly one-half of the commutating cycle (the condition described with reference to Figs. 2 and 3). This may be shown mathematically as follows:

The pulses in the output circuit of the receiver shown in Fig. 1 (the current applied to the winding 24) may be expressed in terms of a Fourier series, the fundamental frequency of which is the same as that of the commutating voltage. Furthermore, the only term in this series which is of interest is the fundamental, since only currents of this frequency can affect the indicator. The magnitude of this fundamental component may be found in terms of the maximum value, width and timing of the impulses by applying the usual methods for the determination of the magnitudes of the components of the various terms in a Fourier series. For instance, the series may be written in terms of sine functions, which gives the magnitude of the fundamental term as $$(3) \quad A = \frac{4E}{\pi} \int_{\frac{\pi}{2}-\frac{\alpha}{2}-\frac{\beta}{2}}^{\frac{\pi}{2}-\frac{\alpha}{2}+\frac{\beta}{2}} \sin(wt)d(wt) = \frac{8E}{\pi} \cos\frac{\alpha}{2} \sin\frac{\beta}{2}$$

where $\alpha$ is the angle of overlap of the rectified current envelopes from the two antennas 1 and 2 and $\beta$ is the width of each of the impulses shown in curve 47 of Fig. 5 and curve 55 of Fig. 7.

Figure 9:
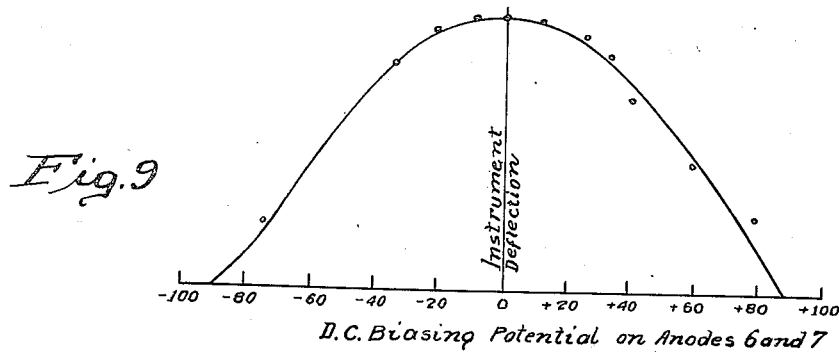

It will be noted that this expression (3) predicts that the sensitivity should vary with the cosine of half the angle of overlap. This result is indicated graphically in Fig. 9, which indicates the varying sensitivity with different bias voltages on the tube 3 as determined experimentally.

Since the magnitude of each modulation impulse produced in response to a phase difference between the voltages on the two antennas is independent of the frequency of switching, and the number of impulses produced in a given period of time depend upon the total number of cycles of the switching frequency occurring in that time, the total effective current applied to the winding 24 of the indicating instrument should increase as the frequency of the switching or commutating current is increased. Hence the sensitivity should be increased by increasing the frequency of the commutating voltage. On the other hand, with indicating instruments of the dynamometer type that are available, the sensitivity of the instrument falls off at higher frequencies so that the optimum commutating frequency to be employed in any case will be determined by the characteristics of the indicating instrument available and also by the characteristics of the low frequency amplifier.

Heretofore, the discussion has not taken into consideration modulation components on the radio waves received. As a matter of fact, compasses of the type to which this invention relates will often be employed in connection with broadcast stations transmitting voice modulated carrier waves and such waves will occasionally carry a component of the commutating frequency. Such components may cause violent fluctuations of the indicator needle. However, they are of relatively short duration and may be eliminated for all practical purposes by either mechanically or electrically damping the instrument 25 so that it responds only to persisting impulses. In Fig. 1 the resistances 22 and the condensers 23 are provided for the purpose of eliminating to a large extent from the winding 24 components of frequencies above that to which the instrument is tuned (the commutating frequency). The resistances 22 also prevent by-passing away from the head phones 21 substantial amounts of the currents of higher audible frequencies.

If desired, a filter designed to pass only currents of the commutating frequency may be inserted ahead of the instrument coil 24.

Although in the circuit of Fig. 1 a radio receiver of the tuned radio frequency type has been disclosed, it has been found in practice to be immaterial what type of receiver is employed. Thus receivers of the superheterodyne type, which convert the received radio frequency to a lower intermediate frequency prior to final detection, appear to work as efficiently as any other type of circuit. This is important because the superheterodyne circuit is particularly efficient in receivers adapted to cover a wide range of frequencies.

Although the circuit of Fig. 1 discloses a system in which the radio frequency waves from the two antennas are combined prior to detection, it will be quite obvious from the curves in Figs. 2 to 7, inclusive, that it is immaterial whether the impulses from the two antennas are combined before or after detection since the currents of the commutating frequency which produce the indication are produced by components of the signals received on the two antennas which are preserved through detection and appear in the output of the detector. In general, a system of the type disclosed in Fig. 1, in which the impulses from the two antennas are combined before detection, is preferable because it is more simple, requiring only one radio frequency amplifier and one detector whereas if the impulses were not combined until after detection it would be necessary to have a separate radio frequency amplifier and a separate detector for each antenna.

In general, the only requirements of the antenna system to be used in my system are that the two antennas be spaced apart and symmetrically disposed with respect to a mid plane therebetween. As shown in Fig. 1, each antenna comprises a vertical conductor functioning as a collector of energy and a horizontal lead-in conductor connecting the vertical conductor to the receiving set. It was previously stated that it is desirable to shield the lead-in conductors as by enclosing them in grounded shields 8 and 9, respectively. The advantage of shielding the horizontal portions of the lead-in conductors is that occasionally large conductors in the vicinity of the compass system, which may extend substantially parallel to the plane of the antennas 1 and 2, receive and re-radiate energy from the radio wave, the re-radiation being effected in such a direction as to develop potentials opposite in phase in the horizontal portions of the two antennas 1 and 2. Such signals can easily be of sufficient magnitude to blanket the signals received on the vertical portions of the antennas and thereby produce false indications.

Although the system is not limited to aircraft, it is particularly useful in connection therewith because of its simplicity and particularly the simplicity of the antenna structure required.

Several typical antenna installations for airplanes are disclosed in Figs. 10 to 13, inclusive.

Figure 11:
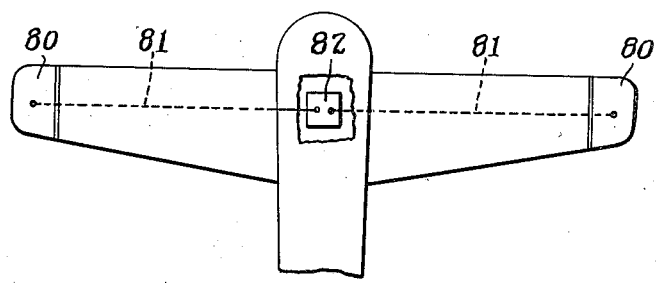
Fig. 11 is a plan view of the front portion of an airplane illustrating a modified type of antenna installation.

In Fig. 11 an installation on a metal airplane is shown in which the tip portions 80 of the wings of the airplane are insulated from the remainder of the airplane and these tip portions employed as the two antennas, lead-in conductors 81 extending from the insulated tip portions 80 to the radio receiver 82 which may be of the type described in connection with Fig. 1.

Figure 12:
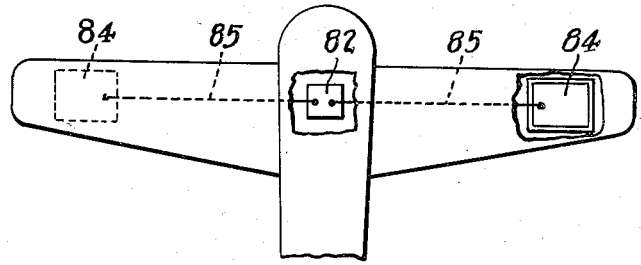
Fig. 12 is a view similar to Fig. 11, illustrating still another type of antenna installation.

Fig. 12 discloses an installation in which the two antennas comprise flat insulated sheets of material 84 positioned within the wings of the airplane adjacent the tips thereof and connected to the receiver 82 by the lead-in conductors 85. In the installations of both Fig. 11 and Fig. 12 the lead-in conductors 81 and 85 are preferably shielded.

Figure 13:
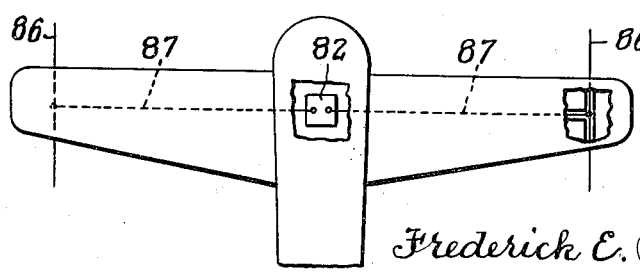
Fig. 13 is another view similar to that of Fig. 11 showing still another type of antenna installation.

In Fig. 13 the antenna structure comprises a pair of straight horizontal conductors 86 positioned near the tips of the wings and partially within the wings and extending fore and aft. Each conductor 86 is connected at the center to the receiving set 82 by lead-in conductors 87 which are preferably shielded.

The conductors 86 instead of being extended fore and aft may be extended vertically or may be extended rearwardly. A very practical installation consists of two conductors extending from the tips of the wings rearwardly to the rear elevator structure, the rear ends of the conductors converging, if necessary, toward the axis of the airplane. Such an installation has the advantage of creating little additional wind resistance.

It has been previously stated that my system is adapted for indicating the vertical angle of the direction of propagation of the received radio wave as well as the horizontal angle. In order to produce an indication of the vertical angle of the received wave, it is merely necessary to space the two antennas vertically instead of horizontally and position the instrument 25 so that the indicator moves vertically instead of horizontally.

No complications result from the repositioning of the antennas as described to produce vertical indications because of the fact that each antenna itself is non-directive and may be extended in any direction desired so long as the two antennas are symmetrically positioned with respect to each other.

Figure 10:
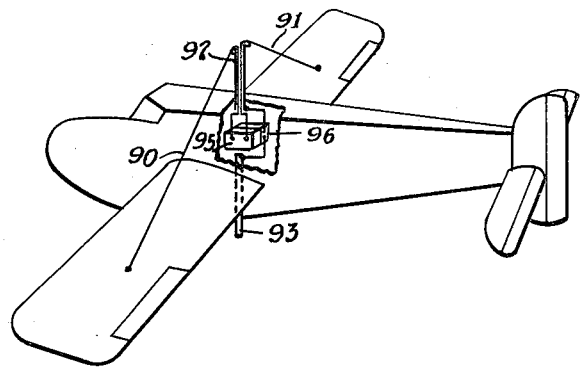
Fig. 10 is a perspective view of an airplane showing one method of installing an antenna system for a radio compass in accordance with my invention.

A convenient antenna system for use on an airplane to produce both vertical and horizontal indications is shown in Fig. 10, which system consists of a pair of horizontal antennas 90 and 91, respectively, attached to the upper sides of the wings of the airplane at their outer ends (suitable insulators being employed to insulate the conductors from the wing structure) and the inner ends being attached to the upper end of a hollow metal strut 92 (but electrically insulated therefrom) and connected to the receiving set 95 by lead-in conductors extending down through the strut 92. The strut 92 is rigidly attached to the top or upper side of the fuselage but is electrically insulated from it. This strut is connected at the lower end to the receiver 96. The strut 93, which is a counterpart of the strut 92, is attached below the fuselage in line with the strut 92 and electrically insulated from the fuselage. Strut 93 is connected at its upper end to the receiver 96.

It will be observed that there are two complete and separate installations, one comprising the receiver 95 and the antennas 90 and 91, and the other comprising the receiver 96 and the vertical struts 92 and 93 which function as antennas. The indicator associated with the receiver 95 will be positioned to give horizontal indications as shown in Fig. 1, and the receiver 96 will have its indicator positioned to give vertical indications.

It will be observed that in the arrangement shown in Fig. 10 the outer ends of the antennas 90 and 91 are lower than their inner ends. It is also quite possible that the outer ends may be further forward or further aft than the inner ends. Such displacements are immaterial so long as the structures of the two antennas are symmetrical with respect to the median plane.

It has been found that when using my system in an airplane, it makes no difference whether or not the casing of the instrument is connected to or disconnected from the bonded parts of the aircraft.

A system may be conveniently balanced after installation by placing the two antennas at right angles to the known direction of a radio transmitting station and adjusting the condenser 10 until the indicator is in neutral position.

A system with vertically spaced antennas for indicating the vertical angle of a received radio wave is particularly useful in making blind landings when the airplane is approaching the landing field. When employed for such purposes it is desirable to have a special transmitting station positioned on the landing field, and the radiating antenna of such a system may be located in a pit in the landing field which is covered with a covering flush with the surface of the field. For such purposes ultra short wave length transmitters will be most adaptable.

It is to be understood that the phase displacement of the radio frequency waves received on the two antennas has been greatly exaggerated in curves of Figs. 2 to 7. As a matter of fact, the displacement is so extremely small that it would not be perceptible if such curves were drawn to scale. The actual phase displacement of the radio frequency waves is a function of the wave length of the received wave and the spacing of the two antennas in the direction of propagation of the wave. The latter distance is in turn a function of the distance between the two antennas and the angle between the line joining the two antennas and the plane of the wave front.

Obviously for a given angular displacement there will be a greater separation of the two antennas in the direction of propagation of the wave if they are a substantial distance apart than if they are close together.

The duration of each impulse in curves 67 of Fig. 3, 47 of Fig. 5, and 55 of Fig. 7 is a function only of the actual time displacement between the waves from the two antennas, which is the same regardless of frequency. It would seem, therefore, that the sensitivity of the system would be substantially independent of the frequency of the received radio waves. This result has been checked by experiment and it seems that the system is substantially independent of the frequency of the received impulses for a very wide range.

In describing the invention with reference to Fig. 1, a switching device consisting of a duodiode vacuum tube, the two anode-cathode circuits of which are made alternately conductive by applying potential from the low frequency oscillator thereto, was disclosed. An electronic interrupter of this type is particularly well adapted for the purpose because of the fact that it is very simple and rugged, involving no moving parts or contacts, and produces a very rapid make and break. However, the operation of the system is not dependent upon this particular type of switching device and if desired mechanical switching systems involving rotating or vibrating contacts may be employed. It is quite essential, however, that whatever switching system be employed each antenna should be connected to the receiving set for the same length of time and the time of making and breaking the circuits should be less than one half cycle of the radio frequency. If the time during which the switching mechanism changes its impedance is allowed to become long as compared with one of the radio frequency cycles, the magnitudes of the currents due to the first and last cycles of the conducting circuit will be correspondingly reduced and these cycles are the only ones which are affected by the phase difference between the radio frequency currents from the two antennas. Therefore, a switching device which provides a slow make and break would be relatively inefficient or even inoperative.

Although the actual phase displacement between the currents from the two antennas is extremely minute in response to slight deviations of the antennas from neutral position, nevertheless the system has been found in practice to be very sensitive and compares favorably in this respect with other known systems. In a typical installation a phase angle between the two radio frequency currents from the two antennas of only about $1.5 \times 10^{-3}$ radians (the frequency of the radio waves being about 825,000 cycles) produced a half scale deflection on the indicating instrument.

The sensitivity would normally depend to a certain extent on the strength of the received signal. However, it has been found in practice that by employing a radio receiver of relatively high sensitivity with automatic volume control the instrument deflections for a given angular displacement of the two antennas from neutral position is substantially the same for all signals.

In describing the invention, it has been assumed that conditions were such that the wave trains from the two antennas were of equal lengths and magnitudes. If the wave trains from the two antennas are not of equal length and magnitude then, when combined, they will produce a current of the commutating frequency even though there is no time lag between the two high frequency currents. Theoretically the component of commutating frequency produced under such conditions will be 90° out of phase with the current produced in response to a phase difference between the high frequency waves. Therefore, it may be possible to so adjust the phase of the current supplied to the moving coil of the dynamometer instrument, relative to the field of the instrument, that only the component produced in response to phase differences between the radio frequency currents will affect the instrument. Under such conditions the system could be made to operate on radio frequency trains from the two antennas of unequal lengths and/or magnitudes. However, it is more simple and preferable to make the impulses from the two antennas equal in length and magnitude and thereby prevent extraneous currents of the commutating frequency.

Furthermore, although in the ideal arrangement of parts two antennas will be symmetrical, it is possible to use non-symmetrical antennas and still get useful results. Thus a certain amount of asymmetry in the dimensions and positions of the two antennas can be compensated for by adjusting the balancing condenser 10 or by introducing compensating circuits in other parts of the circuit. In general, however, any marked lack of symmetry in the antenna structure is to be avoided because, while it may be possible to compensate for the lack of symmetry under conditions of small displacement from neutral position, reversed readings may be obtained when the compass is directed at a substantial angle to the direction of propagation of the received waves.

For practical purposes it is desirable to maintain the frequency of commutation constant. However, it is to be noted that constant commutating frequency is not essential. The only thing that is essential in this connection is that the frequency of the current applied to the field of the dynamometer indicator always be in synchronism and proper phase relation with respect to the commutating device.

Although the compass has been described with reference to an installation for providing a visual indication of the direction of the received radio signal, it is to be understood that the invention is not so limited. Thus by supplying the detector output component of the commutating frequency to a pair of headphones, an aural indication can be obtained in response to a deviation from the on course position. Furthermore, instead of actuating a visible indicator, the dynamometer instrument can be made to actuate a movable contact cooperating with fixed contacts to constitute a relay for controlling other apparatus. Systems have been developed in which a movable indicator some distance away from the dynamometer instrument itself can be made to move to at all times indicate the direction of a radio transmitting station in response to currents received over contacts controlled by the dynamometer type instrument. It has been proposed to use such systems at airports for indicating at several different spaced apart points the direction of an airplane. My system is particularly adapted for use in such installations because it is very efficient at the short wave lengths employed for radio transmission from airplanes.

Another advantage of my system is that it is relatively free from what is commonly known as "night effect". Night effect causes the indicator of a radio compass to swing over a wide range instead of giving a steady indication of the direction of the transmitting station and is particularly objectionable with radio compass systems employing loops. It is believed that the errors resulting from night effect are caused by the reception of certain components of the radio wave on the horizontal portions of the loop. Whether or not this explanation is correct, I have discovered that by shielding the horizontal portions of the lead-in conductors from the two antennas in my system, the disturbances due to night effect are very greatly reduced.

Another advantage of my system over previous compass systems known to me is that the system never operates on the null point of a received signal, as does a loop. The advantage of this is that in my system, even when the antennas are directly in the plane front of the received radio wave (the normal on course position) full signal strength is being received to actuate the head phones for communication purposes. In fact in my system the signal is always received at full amplitude regardless of its direction.

My system also has the very important advantage that it can be made substantially immune to vibrations, changes in temperature, etc., which often upset compass systems of other types known to me. The reason for this is that in all of the other systems of which I am aware it is necessary to employ numerous balancing condensers in various parts of the circuit, which condensers must be very carefully adjusted and are liable to lose their adjustment during use as the result of weather changes, vibration, etc. It is most important to avoid apparatus capable of getting out of adjustment in use because the pilot of an airplane would have no indication whatsoever that his compass was not giving him a correct indication and disaster might result. In my system, on the other hand, as illustrated in Fig. 1, there is only a single balancing condenser (the condenser 19) and even this condenser can be eliminated by carefully proportioning the parts of the apparatus in manufacture, thereby making it almost impossible for the compass to become inaccurate in service.

Although the invention has been explained by describing a specific embodiment, it is to be understood that many changes can be made in the particular circuit described without departing from the invention and the latter is to be limited only as set forth in the appended claims.

I claim:

1. The method of indicating phase differences between two high frequency, alternating currents which comprises successively interrupting said currents, combining and detecting said interrupted currents to produce a component of the interrupting frequency in response to phase differences between the high frequency currents, selecting from the detected current said component of the interrupting frequency and producing an indication in response to it.

2. The method of detecting phase differences between two high frequency, alternating currents which comprises alternately interrupting said currents at periodic intervals for equal periods of time, combining said interrupted currents and detecting them, and analyzing said detected current for an alternating current component of said interrupting frequency.

3. The method of indicating phase differences between two high frequency, alternating currents comprising alternately interrupting said currents at periodic intervals for equal periods of time, combining said interrupted currents and detecting them, producing an alternating magnetic field of said interrupting frequency, producing a magnetic field in response to said detected current and causing said two magnetic fields to interact to produce an indication of a component in said detected current of said interrupting frequency.

4. The method of indicating phase differences between high frequency alternating currents, which comprises alternately interrupting said currents at periodic intervals for equal periods of time, combining said interrupted currents and detecting them by suppressing one-half of the resultant current wave, selecting from the detected current a component of the interrupting frequency and producing an indication from it.

5. The method of indicating phase differences between two separate alternating current waves, which comprises interrupting said waves into alternately recurring trains, combining said trains whereby they interact to produce a modulation component of the interrupting frequency in response to phase difference between said two waves, and producing an indication of the phase and magnitude of said modulation component.

6. The method of producing an indication of phase difference between two carrier currents of the same frequency, which comprises combining said currents, causing them to interact to produce an alternating modulation component of fixed predetermined frequency different from the frequency of the carrier currents in response to a difference in phase between said carrier currents, and measuring said modulation component of predetermined frequency.

7. The method of indicating phase differences between two high frequency alternating current waves, which comprises successively alternately interrupting said two waves at periodic intervals long as compared to the period of the high frequency waves whereby each high frequency wave is converted into a series of periodically recurring trains of waves and producing an indication in response to persistently recurring differences between the end cycles of the two series of wave trains.

8. The method of determining the direction of propagation of a radio wave relative to a line interconnecting two predetermined spaced apart points comprising independently deriving from said radio wave at said two points two separate and distinct radio frequency currents, successively interrupting said currents at periodic intervals for equal periods of time, combining said interrupted currents and detecting them, selecting from the detected current the component of the interrupting frequency and producing an indication therefrom.

9. In a radio compass system, two symmetrical spaced-apart, electrically separate, antennas, detecting means, switching means for selecting waves alternately from said two antennas and applying them to said detecting means, and indicating means connected to said detecting means responsive only to alternating current of the frequency of said switching means.

10. In a radio compass system, two symmetrical spaced-apart, electrically separate, antennas, switching means for selecting waves alternately from said two antennas, means for combining said selected waves, means for detecting the combined waves, and indicating means connected to said detecting means responsive only to alternating current of the frequency of said switching means.

11. A device for indicating phase differences between two high frequency alternating current waves comprising synchronous switching means for alternately suppressing said two waves for equal intervals, means for detecting and combining the unsuppressed portions of said two waves, indicating means connected to said detecting and combining means responsive only to alternating current of the frequency of said synchronous switching means, said indicating means comprising a dynamometer type instrument having a field energized with alternating current of the frequency of said synchronous switching means, and a moving coil element adapted to react with said field connected to said detecting and combining means.

12. In a radio compass system, two symmetrical, spaced apart antennas, a detector, a dynamometer type indicating instrument having two members adapted to react upon each other when and only when excited with current of the same frequency, means for energizing one of said members of predetermined low frequency, and means for alternately connecting said two antennas to said other member of said instrument through said detector in synchronism with said predetermined frequency.

13. In a radio compass system, a radio receiving set having input and output terminals, a pair of spaced apart substantially symmetrical, electrically independent antennas, a dynamometer type indicating instrument having two actuating windings adapted to interact upon each other to produce an indication when both are excited with current of the same frequency, means connecting the output terminals of said receiving set to one of said instrument windings, switching means for alternately connecting said two antennas to said input terminals of said receiving set, and means for synchronously actuating said switching means and energizing the other winding of said indicating instrument with alternating current.

14. A radio compass comprising a symmetrical pair of spaced apart non-directional antennas, a radio receiving set having input terminals and output terminals, switching means for switching the input terminals of said receiving set alternately from one antenna to the other at a frequency less than the radio frequencies adapted to be received by said antennas, and an indicator connected to the output terminals of said receiving set capable of responding only to currents of the frequency of the switching mechanism and yielding an indication of the magitude of such currents.

FREDERICK E. NICKEL.